J. T. AUSTIN.
ORGAN.
APPLICATION FILED JUNE 15, 1911.

1,145,867.

Patented July 6, 1915.
4 SHEETS—SHEET 1.

Witnesses:
H. Mallner
Caroline M. Breckle

Inventor
John T. Austin
By W. H. Houiss, Att'y.

J. T. AUSTIN.
ORGAN.
APPLICATION FILED JUNE 15, 1911.
1,145,867.
Patented July 6, 1915.
4 SHEETS—SHEET 2.
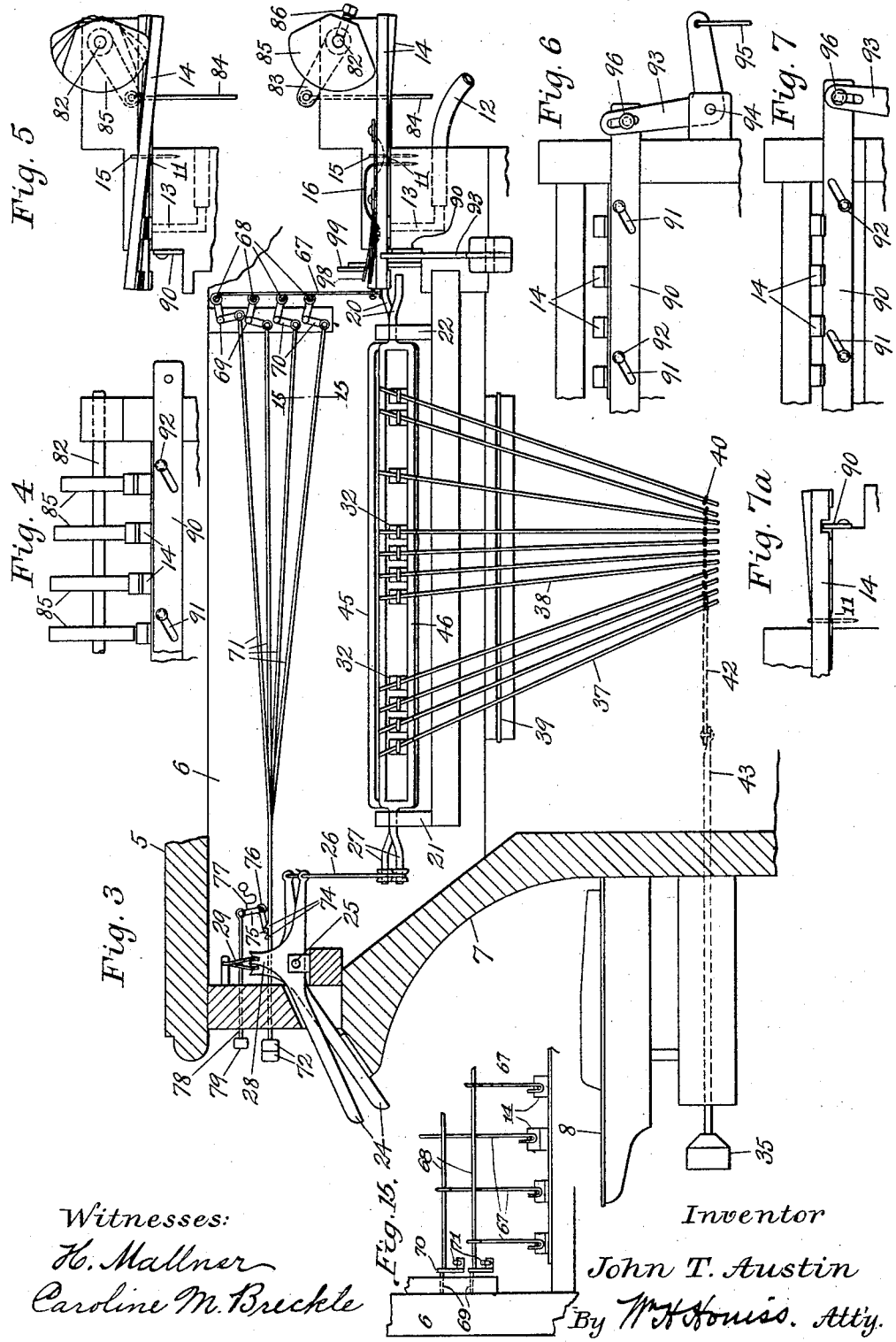
Witnesses:
H. Mallner
Caroline M. Breckle
Inventor
John T. Austin
By W. H. Houiss. Atty.

J. T. AUSTIN.
ORGAN.
APPLICATION FILED JUNE 15, 1911.

1,145,867.

Patented July 6, 1915.
4 SHEETS—SHEET 3.

Witnesses:
H. Mallner
Caroline M. Breckli

Inventor
John T. Austin
By W. H. Honiss, Atty.

J. T. AUSTIN.
ORGAN.
APPLICATION FILED JUNE 15, 1911.
1,145,867.
Patented July 6, 1915.
4 SHEETS—SHEET 4.
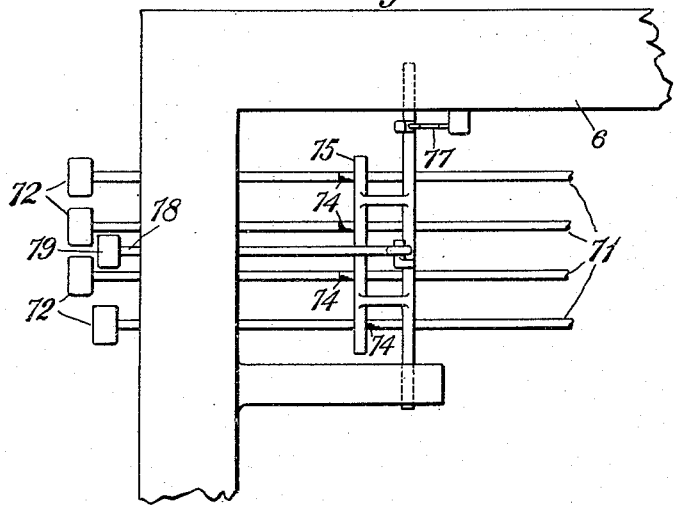
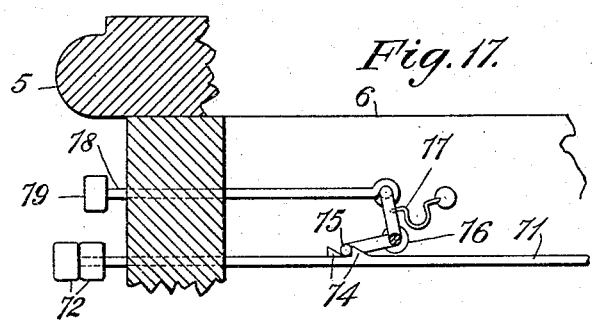
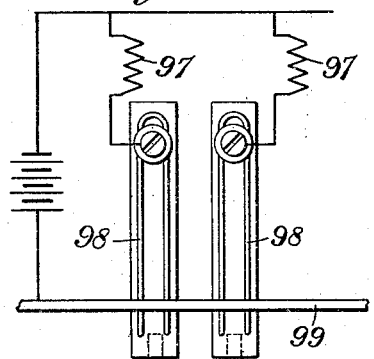
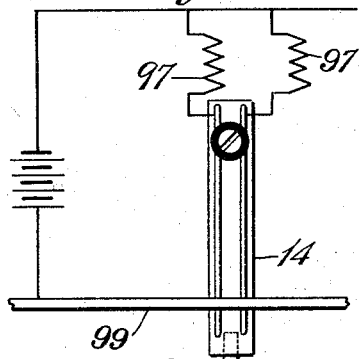
Witnesses:
S. S. Grotta.
Caroline M. Breckle.
Inventor:
John T. Austin
by Wm H Honiss
Atty.

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

ORGAN.

1,145,867.  Specification of Letters Patent. Patented July 6, 1915.

Application filed June 15, 1911. Serial No. 633,262.

*To all whom it may concern:*

Be it known that I, JOHN T. AUSTIN, a citizen of the United States, residing at Hartford, in the county of Hartford and State of Connecticut, have invented new and useful Improvements in Organs, of which the following is a specification.

This invention comprises improvements in the construction, organization and arrangement of organs, the general object being to provide means whereby a more varied and extended control of the operation of the organ and of the possible combinations and sub-combinations of couplers and stops is placed in the hands of the organist.

It includes means whereby different desired combinations of stops may be arranged by the organist in advance, ready for instant use, without in the least interfering with the free and unlimited use of the same stops or any of them in other combinations.

Figure 1:
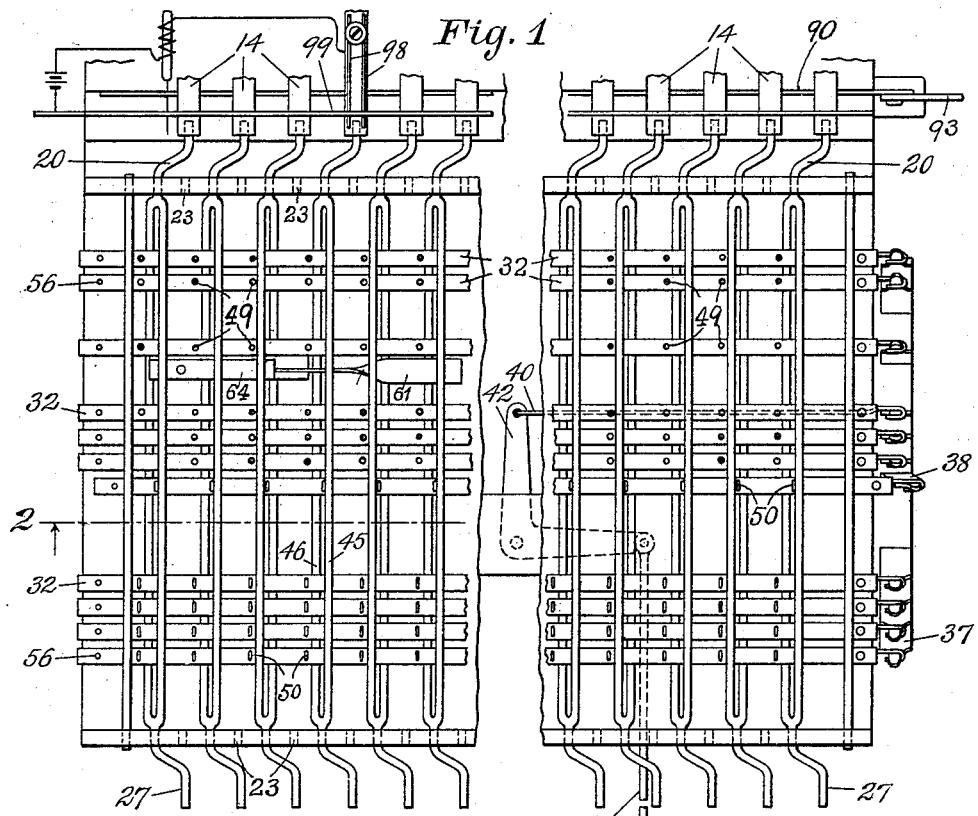
Figure 2:
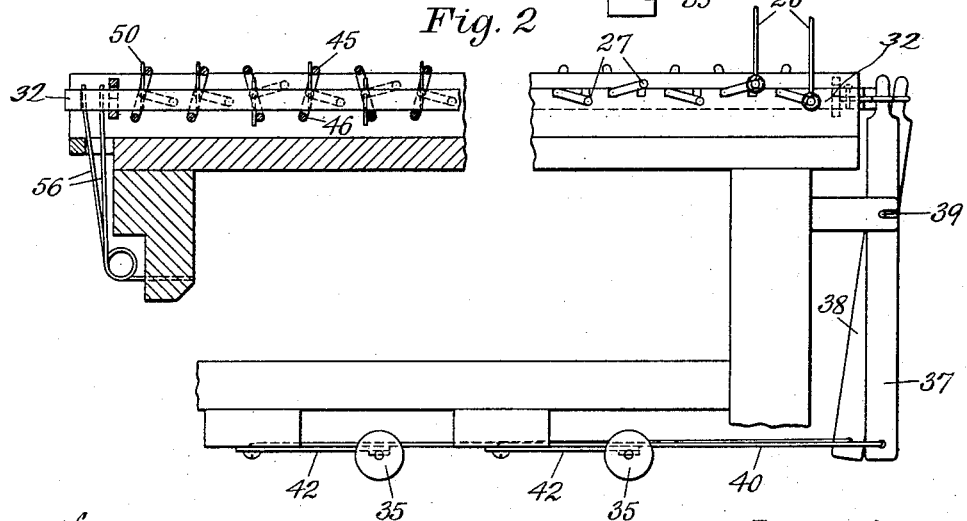
Figure 11:
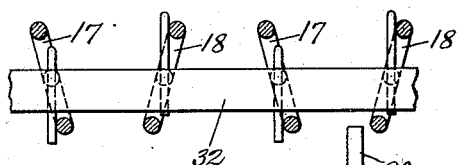
Figure 12:
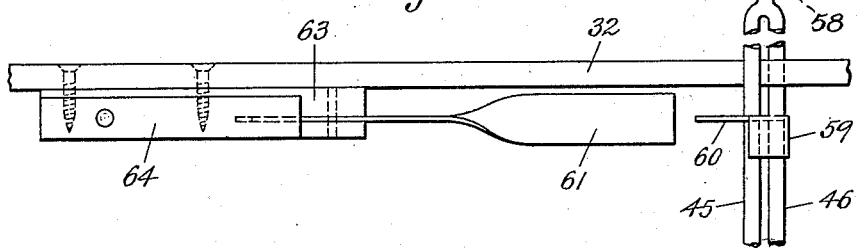
Figure 13:
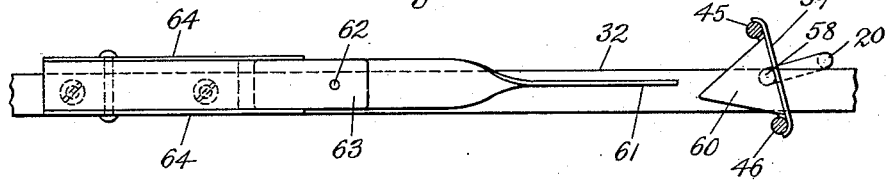
Figure 14:
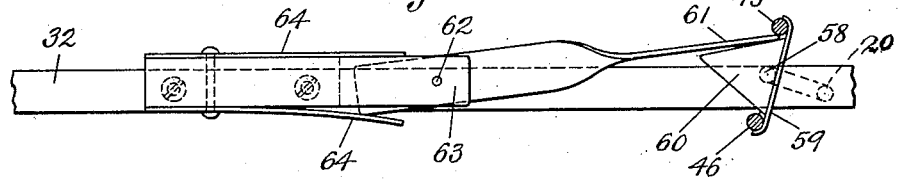

Figure 1 of the drawings is a plan view showing a number of the devices for controlling the respective stops. Fig. 2 is a front view projected from Fig. 1, and is shown partly in section taken on the line 2 of Fig. 1. Fig. 3 is an end view projected from the right hand ends of Figs. 1 and 2, showing in connection therewith a sectional end view of the adjacent and related portions of the organ console. Fig. 4 is a front view and Fig. 5 an end view of the crescendo action, showing it in operative position. Figs. 6 and 7 are front views showing the sforzando action; Fig. 6 shows the sforzando bar in its lower position, out of operation, while Fig. 7 represents the bar in its upper position, at the extreme end of its action. Fig. 7ª is a left end view projected from Fig. 7, illustrating a method of exempting some of the stop actions from the operation of the sforzando bar. Figs. 8 to 11 inclusive are front views in section taken in front of and parallel with one of the traces 32, showing different positions of the trace and roller devices for effecting different combinations of stops. Figs. 12, 13 and 14 are front views showing the construction and illustrating the action of the pedal reversing devices. Fig. 15 is a front view in section taken on the line 15—15 of Fig. 3, showing the cranked rods and the manner of their connection with the stop valves. Fig. 16 is a plan view and Fig. 17 an elevation, both in enlarged scale, showing the details of the latch mechanism at the left hand portion of Fig. 3. Figs. 18 and 19 are plan views showing arrangements of the branch electrical circuits of Figs. 1 and 3.

These improved devices are herein shown in connection with the console of an organ, the top of which is represented by 5, the left hand end by 6, and the front by 7.

8 represents one bank of keys, of which there may be as many banks as may be required. The connections of these keys and banks of keys with their valve devices of their respective organ pipes may be of any well-known construction; and as they form no part of the present invention are not herein shown. The top or lid 5 is hinged or otherwise removable to give ready access to the interior for setting, adjusting and inspecting the various combinations.

The series of pipes constituting the several stops of the organ may, as usual, be placed in any convenient portion of the church or other edifice, either near to or distant from the console, as may be most convenient, the operating connections between the console and the pipes being either mechanical, pneumatic, or electric, according to the judgment or preference of the organ builder. The several stops are provided with suitable stop sliders or other well-known valve or pallet devices, for throwing any or all of them into and out of operation. These sliders or other controlling devices for the stops are herein assumed to be controlled from the console by electrical connections operating through the circuit wires 98, 99, or by pneumatic action operating through the tubes 12, one of which is provided for each stop slider or valve. These pneumatic tubes 12 terminate in or near the console in a row of ducts 13, which are opened and closed by pallets attached to levers 14, herein designated as stop valves, which are arranged side by side and are pivoted on suitable pivot rails which in this instance consist of wires or rods 11 seated between the valve pins 15 and the springs 16 adjacent to their retaining pins 15. These stop valves are held down upon their respective ducts in any convenient way, as by the springs 16. The operation of these stop valves 14 for the various stops is controlled by different independent sets of mechanism, acting upon different portions of those valves. In the arrangement herein shown, the rearward ends of those valves are acted upon by the crescendo mechanism, as illustrated in Figs. 4 and 5. The forward ends of the valve are acted upon by various mechanisms by which the valves may be operated either separately or in particular combinations, as may be determined by the organist.

The forward ends of the series of stop valves 14 are raised to "draw on" their respective stops, by means of a set or series of skeleton rollers 17, 18 and 20, which are mounted side by side as shown in Figs. 1 and 2, being journaled near their ends in the supporting bars 21 and 22. The rearward ends of these rollers are cranked or offset as shown in Fig. 1, and project beneath the front ends of the valves 14, so that any valve may be lifted by turning its corresponding roller in the proper direction. Two different sets of means are provided for thus turning the rollers to operate the valves, one of the said operating means being adapted for actuating the separate rollers independently, and the other being adapted for operating the rollers either singly, or two or more of them together in predetermined combinations. In Figs. 8, 9, 10 and 11 these operating rollers are shown in enlarged scale under different conditions of use, for which purpose other numerals are specifically applied to the different parts in place of the numeral 20 which in Figs. 1, 2 and 3 are applied to the skeleton rollers in general.

Each roller is connected with a tablet 24, which projects through or is exposed to view and operation at the front of the console. In the present instance these tablets are pivotally mounted at 25 and their rearward ends within the console are connected by means of the rods or wires 26 with the front ends 27 of the rollers 20, as shown in Figs. 2 and 3, these front ends being cranked or offset as best shown in Figs. 1 and 2. These tablets are arranged to be moved to two different positions, represented in Fig. 3. As thus arranged, pressing the front end of the tablet to its lower position lifts the corresponding valve 14 and thereby puts into action its associated stop action or coupler, as the case may be. Conversely, when the front end of the tablet is raised to its upper position, the valve 14 is allowed to close, thus throwing the associated stop or coupler out of action. As a means for holding the tablet yieldingly in each of its two positions represented in Fig. 3, it is provided with an upwardly extending arm 28, which engages with a swinging spring 29, of the "grasshopper" or any other suitable type, which tends to hold that arm to which ever side of its vertical position it may be placed.

The exposed portion of the tablet 24 is commonly and preferably marked with a name or symbol indicative of the stop or coupler which it is adapted to operate. These tablets being connected with the respective rollers, thus indicate at all times which of them are "on" or "off," whether operated independently by the hand of the organist, or operated by the interior composition or combination mechanism. Therefore, by looking along the row of tablets 24, the organist can at any time observe which stops or couplers are on and off.

In addition to the means just described for operating any of the stops or couplers by hand independently, means are also provided whereby several different combinations or "compositions" of stops may be prearranged by the organist prior to a recital or other performance, and be thus held in readiness for selective use at any time in any desired sequence, any of these combinations being thus ready for use at any moment, either according to the prearranged program of the organist, or according to his impulse or fancy, as the case may be, without interference with each other. In the embodiment of this invention herein shown one of the means for thus operating the stops in a variety of combinations or compositions, consists of a number of traces 32, which lie side by side and extend transversely of the set or series of rollers 20, and are provided with adjustable means for selectively turning one or more of these rollers in one direction or the other to open or close their associated valves. This turning movement of the rollers is effected by the longitudinal movement of the traces, the latter movement being effected by a suitable connection made between each trace and a push knob or button 35 arranged adjacent to the keyboard, and preferably arranged in rows parallel with the particular bank or banks of keys with which they are most commonly or naturally employed. The connection between the series of traces 32 and their respective push knobs 35 is herein shown to consist of a series of levers 37 pivoted at 39 to the frame. Each trace is provided with one of these levers, being connected thereto at the upper end of the lever as shown in Figs. 2 and 3. The lower ends of these trace levers 37 are connected by means of suitable wires or rods 40 and 43 with the push knob 35, a bell crank or "square" 42 being used when needed to make connections at an angle. Thus a separate push knob 35, with its connected trace 32, is employed for each of the desired combinations, and the series of knobs 35 are preferably provided with suitable figures or other symbols to enable the combinations represented by them to be identified by the organist.

The traces 32 pass between the two oppositely disposed crank-like rods 45 and 46, which form the skeleton of the rollers 20, and are united at their ends to the offset or cranked ends of the rollers, all of the traces passing through all of the rollers. Each roller represents a stop, and each trace stands for an independent combination of the stops. The rollers may be made long enough to accommodate any desired number of traces required for the different combinations which may be wanted. Various forms of spurs or latches may be provided for effecting the engagement between the traces and the several rollers. In the arrangement shown herein the connecting means is shown to consist of a series of well-known split pins or cotter pins 50, 51 and 52. Each trace is provided with a series of holes 49 for these cotter pins, corresponding with the series of rollers, each hole passing transversely through the trace in proper relation to its roller, so that the cotter pins 50, 51 and 52 when placed in these holes will be carried by the endwise movement of the trace against the upper crank member 45, or the lower crank member 46 of the respective rollers 20, thus turning the rollers in one direction or the other, and thereby lowering or raising their respective valves 14, according as the cotter pin is in its upper or lower position, as illustrated in Figs. 8 to 11 inclusive. The two halves of the cotter pin being set to spring outwardly are held either in their raised or lowered positions by friction against the sides of their respective holes. Being very inexpensive, a considerable number of them may be kept conveniently at hand in any suitable box or container, within or convenient to the console. Weights or springs are preferably employed for returning the respective traces to their left hand or "off" positions, after being moved on by their respective knobs 34. In the present instance, this is accomplished by means of springs 56 (Fig. 2) which are secured to any convenient portion of the frame, the upper ends of the springs engaging in holes or in any other convenient way with the left hand end of the trace. By thus returning the traces to their left hand or "off" position, their pins 51 are carried away from the rollers 20, leaving the latter free to be turned by the trace set for the succeeding combination, or to be turned by the tablets 24, or by other independent devices.

Figure 8:
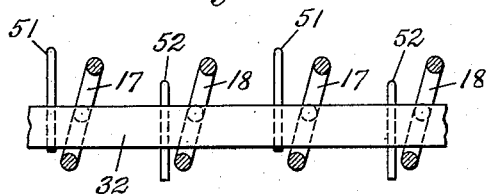
Figure 10:
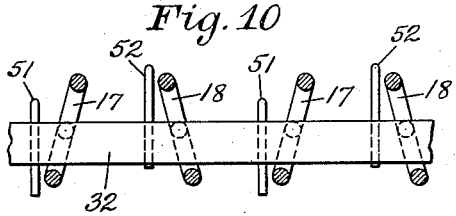

In Figs. 8 and 10 the traces are shown in their off position, in which, as will be seen by reference to these figures, the rollers 20 are left free to turn in either direction. Means are also provided whereby one or more of these rollers may be reversely moved at each subsequent operation of a trace, and a device for effecting this reversing movement is shown in Figs. 12, 13 and 14. The roller 20 supported as at 58 in rails 55 is provided with a dog 59 which is secured to the upper and lower crank rods 45 and 46 adjacent to, and preferably at one side of, the trace 32. A projecting guide portion 60 of the dog 59 extends toward the left in the general path of movement of a reversing pawl 61, which is pivoted at 62 to the side of the trace 32, preferably by means of a pivot block 63. The pawl is yieldingly held in its central position, shown in Fig. 13, by means of springs 64 secured to the top and bottom of the block 63 and bear against the opposite sides of the pawl 61 rearwardly of its pivot 62. As the trace 32 is moved toward the right from the position shown in Fig. 13, and with the guide 60 in the position shown in that figure, the end of the pawl engages with the upper inclined edge or surface of the guide 60 and rides on that surface until it engages with a suitable shoulder of the dog, whereupon the continued movement of the pawl moves the guide and its roller to the position shown in Fig. 14, which is the reverse of that shown in Fig. 13, thereby closing the associated valve 14 and putting out of action its stop or coupler. The trace is then retracted toward the left by its spring 56 and again assumes the position shown in Fig. 13, leaving the dog 59 and its roller in the position shown in Fig. 14. Upon the next forward movement of the pawl its point engages with the lower inclined surface of the guide 60 and is thus guided to the shoulder below the pivot of the roller 20 by means of which the pawl returns the roller 20 to its first position shown in Fig. 13, thereby raising the valve 14 and putting its associated stop or coupler in action, this reversing movement being continued at each forward movement of the trace 32. This reversing attachment may be applied on any trace to operate on any roller, and may be easily transferred from one trace to another, by means of the screws shown in Figs. 12, 13 and 14.

In Fig. 3 is shown additional mechanism for lifting any desired valve or combination of valves 14. Each valve which is thus to be operated has pivotally attached at its front end a connecting rod 67, and the upper ends of these rods are provided with hooks or catches adapted to pass over the offset or cranked portions of the bars 68. These bars are pivotally mounted at 69 in the ends of the casing or in any convenient way, and are provided with operating arms 70, to the lower ends of which are attached the connecting rods or wires 71, which extend through the front of the casing to a position convenient to the hand of the organist, and are provided with push knobs 72. By pushing in any one of these knobs the corresponding cranked bar 68 is raised as illustrated by the uppermost bar in Fig. 3, thus lifting the valve or valves which may be connected to it. The upper ends of the rods 67 are detachably articulated to the bars 68, so that any desired valve or valves may be attached or detached at the will of the organist. A latch device is also preferably employed for holding the rods 71 and their associated connections in their inner position. Each of these rods is provided with a catch 74, which engages with a latch 75 pivotally mounted in any convenient portion of the frame, and resting upon the rods 71. The latch 75 is held in its downward or latching position by any convenient means, as the spring 77. The forwardly extending arm of the latch 75 is provided with a connecting rod or wire 78, which extends through the front of the casing, and is provided with a push knob or button 79, by means of which the latch 75 may be raised at any time by the operator, so as to release whatever rod or rods 71 may then be in their pushed-in position. This mechanism enables the organist to throw into operation any particular stop or combination of stops in addition to and without disturbing the combinations already arranged, and without touching the tablets 24 or the composition knobs 35. The rearward sides of the catches 74 are inclined so as to ride under and lift up the latch 75, so that when any button 72 is pushed in it lifts the latch 75 and releases any of the rods 71 that may have been previously pushed in, and by pushing in the button 79 all of the rods 71 are released and returned to their forward or "off" positions.

The crescendo mechanism is illustrated in Figs. 3, 4 and 5. A shaft 82 is mounted at its ends in the frame of the console, and has fixed upon it an operating arm 83 provided with a connecting rod or wire 84, which extends to a suitable manual or pedal lever within convenient reach of the organist. The cams 85 are mounted side by side upon the shaft 82, being adjustably fixed to place thereon in any convenient way as by the set screws 86. These cams are arranged above the rearward ends of the respective valves 14, which are to be operated by them, and the cams are so adjusted relative to each other and to the said valves as to operate those valves in any desired sequence upon turning the shaft 82. The relative positions of four of these cams and of their coacting valves 14 are shown in Figs. 4 and 5.

The construction and mode of operation of the sforzando mechanism is shown in Figs. 3, 6, 7 and 7ª. The sforzando bar 90 extends transversely of the set or series of valves 14 and underlies their forward ends. The bar is mounted for oblique movement like the movement of a well-known parallel ruler, and may, like that ruler, be mounted upon pivot arms. In the present instance, however, the bar is shown to be provided with inclined slots 91, which engage with the pins or screws 92, which impart an upward movement to the bar as it is drawn lengthwise. The lengthwise movement is imparted by means of a lever which in the present instance is a cranked arm 93, pivoted at 94 to the frame, and operated by a connecting rod 95, which extends to any manual or pedal lever within convenient reach of the organist. The slotted upper end of the arm 93 engages with a pin or screw 96 secured to the bar 90. Upon pulling down the connecting rod 95, the bar 90 is moved to the right and rises from the position shown in Fig. 6 to that shown in Fig. 7, thus elevating the overlying front ends of the valve 14 and putting them all into operation simultaneously. It is sometimes found convenient to exempt certain stops or couplers from the operation of this sforzando mechanism, and a way of doing this is illustrated in Fig. 7ª. That portion of the corresponding valve 14 which overlies the sforzando bar 90 is recessed so as to permit the bar to rise into the recess without operating the valve. Provision is also made for establishing electric communication between the console and the stop and the coupler actions, which may be desirable when the stops, or some of them, are at a considerable distance from the console, and this electrical connection may be employed either instead of or in addition to the pneumatic connection. Suitable contact wires 98 may be attached to the top of the valve lever in position to make electric contact with the contact bar 99 when the valves 14 are lifted. The contact bar 99 may be electrically connected to one side of a battery, while the contact wires 98 lead to solenoids 97, or other suitable electric actions for putting the stops into and out of operation, thence completing the electric circuit through the battery. As illustrated in Figs. 1 and 18, two of the contact wires 98 may be employed upon each valve and these wires may, as shown in Fig. 18, lead to the same electric action for greater certainty of contact, may lead independently to two different electric actions as shown in Fig. 19, or to different stops as may be found most convenient or desirable.

Figure 9:
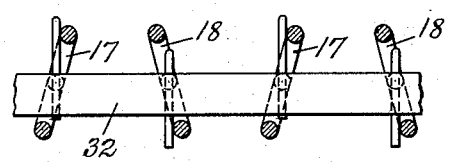

Supplementing the foregoing description of the construction and function of these devices, a brief description will now be given of the method of arranging, adjusting and operating the parts. Having decided upon the stops, couplers, etc., to be included in the combination operated by one of the push knobs 35, for example knob No. 1, the trace 32 appurtenant to that knob is provided by the organist with the proper pins 50. One of these pins is put into each of those holes of the trace which are adjacent to the respective rollers to be operated. Attention is first paid to the rollers of those stops which are to be brought into operation, the pins for such rollers being left in their lowered position, as illustrated by the pins 52 in Fig. 8, so that when that trace is moved to the right by the operation of push knob No. 1, their associated rollers 18 will be turned as illustrated in Fig. 9, without operating the rollers 17 adjacent to the pins 51. These pins 51 being left in their raised positions do not operate at all in the instance illustrated in Figs 8 and 9, and therefore in that particular case might have been left out altogether. But it is generally desirable, in connection with the putting of one combination into operation, to put out of operation certain stops of other combinations which have been previously put in operation. This, and the manner of accomplishing it is illustrated in Figs. 10 and 11, in which it is assumed to be desirable to put out of operation the previously drawn stops represented by the rollers 18, while putting into operation the stops represented by the rollers 17. Hence in this case the pins 51 are pushed to their lowest position, while the pins 52 are left in their raised position. Having thus adjusted all the pins for those rollers which are intended to be operated by the trace 32, the latter is moved to the right by its stop knob, turning the rollers 17 and 18 to the positions shown in Fig. 11. Thus each trace when adjusted for a particular combination operates to leave on whatever stops may already be drawn, suited for that combination, to draw on whatever additional stops may be required, and to throw off whatever stops are undesirable or unsuited for that combination, without any further attention from the organist. He is also enabled to verify the correctness of his arrangement or setting of the respective pins by pressing the corresponding push knobs 35 one after the other, and observing by the resulting movements of the tablets 24 whether the combinations have been correctly set to include the stops desired, and no others.

In Figs. 1 and 2 is illustrated the action of some of the rollers 20, due to the pushing in of a knob 35 connected with the lever 38, which operates through its associated trace 32 to turn the 2nd, 4th, 7th and 9th rollers, counted from the right hand side, the pins 50 of the trace, for these particular rollers, being pushed to their lower positions, as shown in Fig. 2. The composition stop devices operated by the push knobs or tablets 72 may be employed either in combination with, or supplemental to those already described. They may be provided in the original construction of the organ, or be added thereto, without reconstructing or interfering with the other mechanism of the organ. The connections 67 may be made with stop valves 14, which are also operated by the rollers 20, or they may be connected with special stop valves not connected with the rollers 20, as circumstances or preference may indicate. The crank rods 68 and 69 are of a length and size suited to the number and position of the stop valve 14 to be operated by them. They may be in short lengths, and may be disposed at different portions of the width of the organ console, or they may be long enough to extend entirely across the console. The push knobs or tablets 72 and their connections 71 and 70 may be placed at any desired portion of the face of the console, according to the preference of the organist.

The operation of the crescendo and sforzando devices will be understood from the foregoing description of their construction and arrangement. The crescendo cams 85 may be adjusted in any desired relation by means of their respective set screws 86 or other equivalent fastening devices. Suitable weights or springs for returning these crescendo and sforzando mechanisms to their "off" or inoperative positions, may be attached to any convenient portion of their respective connections. The designer may provide for any desired number of the rollers 20, up to the full width of the console, and the rollers and their stop valves may, when necessary or desirable, be arranged in two or more banks, one above the other, holes 23 for bearings for the additional rollers being provided as shown in Fig. 1 wherever desired. The design may also be made to provide for any desired number of traces 32 and their operating levers 37, up to the full length of the rollers 20, which may be of any length likely to be desired. In designing an organ which is initially to be provided with only a few stops, provision may be made for adding other stops and rollers later, by providing in advance the holes 23 or other bearing supports, and in general for the addition of such other connections as may be required by the stops which are to be added later. Similarly, provision may be made for receiving additional traces 32 by making the rollers 20 long enough to receive them, as shown by the spaces left between the groups of traces in Figs. 1 and 3. In manufacturing these traces, it will be found advisable to provide all of them with a full set of the holes 49, one for each of the rollers employed, so that connection may be made by inserting the selecting or connecting pins 50 between any trace and any roller. Similar provision should be made in the console for receiving a number of levers 37 and suitable connections 40, 42 and 43 with push knobs 35 corresponding to the number of combinations which may, either initially or ultimately, be employed on the organ.

The electrical contacts and connections 98 and 99 which are shown in Figs. 1 and 3 as being appurtenant to and operated in connection with the stop valves 14, may be employed either independently of, or, as here shown, in combination with the pneumatic arrangement. The term "stop valve" herein applied to the member 14, in connection with its description as a valve member opening and closing the pneumatic duct 13, is therefore used herein and in the claims in a sense broad enough to include its application to the uses of a contact maker and breaker for electric circuits, as well as its use as a valve for opening and closing a pneumatic duct. Obviously, these particular devices may be modified in many well-known ways, to enable them to accomplish either the separate or combined functions of opening and closing a pneumatic duct, or opening and closing an electric circuit.

The construction and arrangement of the parts may be modified in many respects, to suit the space or position available for the location of the organ console. The direction of movement of the various parts, and their connections for effecting their movements may also be modified, to suit the particular conditions or exigencies of any case, according to the judgment or preference of the organ designer or builder.

I claim as my invention:—

1. The combination with an organ stop action, of a roller mounted for limited oscillation, and having a plurality of eccentric portions whereby it is turned, and having another eccentric portion disposed in operative relation to the stop action for transmitting the turning movement of the roller to the stop action.

2. The combination with an organ stop action, of a roller mounted for limited oscillating movement and having an eccentric portion connected with and transmitting its said oscillating movements to the stop action, and having also a longitudinally extended eccentric portion whereby the roller may be turned by engagement at different portions of its length.

3. The combination with an organ stop action, of a roller mounted for limited oscillating movement and having an eccentric portion connected with and transmitting its oscillating movements to the stop action, and having also a plurality of longitudinally extended eccentric portions whereby it may be oscillated in opposite directions by engagement at different portions of its length.

4. The combination, with an organ stop action, of a skeleton roller mounted for limited oscillating movement and provided with means for operating the stop action by said oscillating movement, the roller having a plurality of rods disposed side by side parallel with each other and eccentric to the center of oscillation whereby the roller may be oscillated in either direction by selective engagement of the said rods and at different portions of their length.

5. The combination, with an organ stop action, of a skeleton roller mounted for limited oscillating movement and provided with means for operating the stop action by its oscillating movement, the roller having parallel rods extending side by side and on opposite sides of the center of oscillation of the roller, whereby the roller may be oscillated by selective engagement with the respective rods and at different portions of their length.

6. The combination, with an organ stop action, of a skeleton roller mounted near its ends for limited oscillating movement and provided with means near one end for operating the stop action by its oscillating movement, the body of the roller being divided to form oppositely and eccentrically disposed members whereby the roller is oscillated.

7. The combination, with an organ stop action, of a skeleton roller for organ stop actions journaled near its ends for limited oscillating movement, the body of the roller between its journals being divided to form oppositely and eccentrically disposed members whereby it may be oscillated, the roller being provided with a cranked portion, for receiving oscillating movement and with another cranked portion for transmitting that movement to a stop action, and independently operated means for oscillating the roller, one of said means engaging with its said eccentric members and another of said means engaging with the first named cranked portion.

8. The combination, with an organ stop action, of a roller journaled for limited oscillating movement and provided with a cranked end for operating the action, and means for oscillating the roller, the body portion of the roller between said journals being divided into two members for receiving between them the said means for oscillating the roller.

9. The combination, with an organ stop action, of a roller journaled for limited oscillating movement and having a cranked end for operating the action, the roller having also a longitudinally extended body divided into two members disposed side by side in substantially parallel relation to each other on opposite sides of the center of oscillation of the roller, and a plurality of means between the said members for actuating the roller.

10. The combination, with an organ stop action, of a roller having a pair of eccentrically disposed portions whereby the roller is turned, and a trace extending between said portions and provided with means for selectively engaging with the said portions to oscillate the roller.

11. The combination, with an organ stop action, of a roller mounted for limited oscillating movement and provided with members disposed on opposite sides of the center of oscillation of the roller, whereby the roller is oscillated, and a trace for operating the roller, provided with means adjustable to engage with one or the other of the said eccentric members of the roller for selectively turning the roller in either direction.

12. The combination, with an organ stop action, of a roller mounted for turning movement, and provided with an eccentrically disposed portion for operating the stop by its turning movement, and provided also with a plurality of eccentrically disposed portions whereby it is turned, and a trace mounted for endwise movement transversely to the axis of the roller movement, and having engaging means for the roller adjustable for engagement with either of its said eccentrically disposed portions for selectively turning the roller in either of its turning directions.

13. The combination, with an organ stop action, of a roller mounted for turning movement and provided with means for operating a stop by its turning movement, the roller being also provided with a plurality of members disposed eccentrically to the axis of turning movement, and a trace mounted for endwise movement transversely to the axis of the roller, and having actuating means adjustable for engagement with either of the said members of the roller for selectively turning the roller in either of its turning directions.

14. Stop operating mechanism for organs, including in combination a series of rollers mounted for turning movement, and provided with means for operating a similar series of stops by their turning movement, and a trace mounted for endwise movement transversely across the axes of the said series of rollers, and provided with means for engaging with the respective rollers of the series for selectively turning the said rollers.

15. Stop operating mechanism for organs including a series of rollers mounted for turning movement and provided with means for operating a corresponding series of stops by their respective turning movements, and a trace mounted for movement transversely across the axes of the said rollers, and provided with adjustable means for engaging with the said rollers independently for selectively turning the said rollers to operate their respective valves.

16. Stop operating mechanism for organs, including a series of rollers mounted for turning movement and provided with means for operating a corresponding series of stops by their respective turning movements, a series of traces mounted for independent movement transversely across the axes of the said series of rollers each provided with roller-engaging portions independently adjustable relative to the rollers for selectively turning the rollers, whereby each trace operates an independent selection of stops.

17. Means for prearranging different combinations of organ stops, including a series of rollers for the respective stops, traces, one for each combination desired, each trace extending substantially across the axes of the rollers, and means, each adjustable into and out of engagement with one roller, whereby each trace may be prearranged for the operation of a selected combination of stops.

18. Stop operating mechanism for organs, including a roller mounted for turning movement, and provided with means for operating a stop by the said turning movement, and a plurality of independent means, disposed in a plane substantially intersecting the axis of the roller, for turning the roller.

19. Organ stop operating mechanism including a roller mounted for turning movement and provided with means for operating a stop by the said turning movement, and a plurality of independently operated connections for turning said roller, at least one of said connections being disposed in a plane substantially intersecting the axis of turning movement of the roller.

20. The combination with stop mechanism for organs of a stop operating roller mounted for oscillation and provided with two eccentrically disposed portions whereby the roller is oscillated, and a trace provided with an adjustable abutment for engaging with either of the said eccentric portions to selectively oscillate the roller in either direction.

21. The combination with stop mechanism for organs, of a plurality of stop-operating rollers each mounted for oscillation and provided with a pair of eccentrically disposed portions whereby the rollers may be oscillated, and a trace provided with an abutment for each roller, the said abutments being adjustable for engagement with either of the said eccentric portions of the respective rollers, whereby any of said rollers may be turned in either direction by a single movement in one direction of the said trace.

22. Stop mechanism for organs, including in combination a plurality of rollers, each mounted for oscillation and provided with a pair of eccentrically disposed portions whereby the rollers may be oscillated, and a plurality of traces each provided with an abutment for each of the rollers, the said abutments being adjustable for engagement with either of the said eccentric portions of the respective rollers, whereby any of said rollers may be turned in either direction by a single movement in one direction of any of the said traces.

23. The combination with stop mechanism for organs of a stop operating roller mounted for oscillation and provided with two eccentrically disposed portions whereby the roller is oscillated, a trace provided with an adjustable abutment for engaging with either of the said eccentric portions, to selectively oscillate the roller in either direction by a single movement of the trace in one direction, and means for effecting the return non-operating movement of the trace to leave the roller free.

24. Stop mechanism for organs including in combination a stop-operating roller mounted for oscillation and provided with two eccentrically disposed portions whereby the roller is operated, a plurality of traces each provided with an adjustable abutment for engaging with either of the said eccentric portions of the respective rollers, whereby the said roller may be turned in either direction by a single movement in one direction of either of the said traces, and means for returning the trace to its first position to leave the roller free to be operated by the other trace.

25. The combination in stop mechanism for organs, of a plurality of stop valves, an operating bar, connections from the said bar to the said stop valves, and manual connections for moving the said bar to actuate the said valves connected to the bar.

26. The combination, in stop mechanism for organs, of a plurality of stop valves, an operating bar, operatively connected with the stop valves and mounted for sidewise movement, connections to operate the said valves by said movement, and manual connections for moving the bar.

27. The combination, in stop mechanism for organs, of a plurality of stop valves, a bar mounted for sidewise movement, manual connections for moving the bar laterally, and detachable connections between the said bar and the said stop valves whereby selected combinations of stops may be connected to the bar.

28. The combination, in stop mechanism for organs, of stop valves, a series of operating bars mounted for sidewise movement, separate manual connections for the said bars, and detachable connections between the said bars and a plurality of the said stop valves, whereby each bar may be operatively connected with a selected combination of the stop valves.

29. The combination, in stop mechanism for organs, of stop valves, a series of operating bars arranged side by side and mounted for sidewise movement, an independent manual connection for moving each bar, and detachable connections between the bars and a plurality of the respective stop valves, whereby any of said bars may be operatively connected with a selected combination of the stop valves.

30. The combination, in stop mechanism for organs, of stop valves, a series of operating bars, disposed side by side and separately mounted for sidewise movement, manual connections for operating the said bars independently, and detachable connections between the said bar and the stop valves, whereby each bar may be operatively connected with a selected combination of the stop valves.

31. The combination, in an organ, of stop mechanism, including a plurality of manual connections each for drawing on a selected combination of stops, a latch for engaging with the said connections, to hold them in their drawn-on position, each of the said connections being provided with means for withdrawing the said latch to release the combinations previously drawn on, when the said connection is operated.

32. The combination, in organs, of stop mechanism for drawing on different selected combinations of stops, manual connections for each of the said combinations, and a latch for holding the said connections in their drawn-on positions, each of the said connections being provided with means for releasing the other combinations from the said latch, whereby each succeeding combination when drawn on releases the previous combinations, permitting them to be drawn off.

33. The combination, in organs, of a plurality of stop valves, and sforzando mechanism therefor, including an operating bar adjacent to a plurality of the valves, and mounted for lateral movement against the valves, to operate them by the lengthwise movement of the bar, and operating connections for thus moving the bar lengthwise.

34. The combination, in an organ, of a plurality of stop valves, sforzando mechanism therefor, including an operating bar disposed adjacent to the said valves, means for moving the said bar lengthwise, and guides for guiding the bar laterally to operate the valves, as it is thus moved endwise.

35. The combination, in organs, of a plurality of stop valves, sforzando mechanism therefor, including an operating bar disposed adjacent to the stop valves, means for moving the said bar endwise, means for guiding the bar laterally against the stop valves as it is drawn endwise, one of the valves being recessed to permit the movement of the bar without moving that valve.

36. The combination, in an organ, of stop mechanism, including a valve, an oscillating member arranged to close and open the valve to draw the stop off and on by its oscillating movements, and an actuating member disposed across and intersecting the axis of the oscillating member, and provided with an adjustable abutment for turning the said oscillating member alternately in opposite directions by the successive movements of the actuating member in the same direction.

37. The combination, in an organ, of stop mechanism, including an oscillating member arranged for drawing a stop off and on by its opposite oscillating movements, and actuating means for oscillating the said member, including a pawl carrier, a pawl mounted thereon for swinging movement for engaging with the oscillating member at opposite sides of its axis of oscillation, means for moving the pawl carrier, and means for guiding the pawl alternately to opposite sides of the center of oscillation at the successive movements of the pawl carrier.

38. The combination, in stop mechanism for organs, of a series of stop valves, an oscillating roller connected with the valve to open and close the valve by the opposite oscillating movements of the roller, a pawl carrier movable relative to the oscillating member, a reversing pawl mounted upon the pawl carrier, and a guide appurtenant to the oscillating roller for guiding the pawl at its successive movements alternately to opposite sides of the center of oscillation of the roller.

39. The combination, in stop mechanism for organs, of an oscillating member arranged to draw a stop off and on by its oscillating movements, mechanism including a pawl for oscillating the said member, and a V-shaped guide plate movable with the oscillating member for guiding the pawl alternately to opposite sides of the center of oscillation of the roller for reversely oscillating the pawl.

40. The combination, in stop mechanism for organs, of means for alternately drawing a stop off and on, including an oscillating member for controlling the stop action, mechanism including a pawl for oscillating the said member, and a V-shaped guide plate appurtenant to the oscillating member, with its apex extending toward the pawl for guiding the pawl alternately to opposite sides of the center of oscillation of the said member, whereby its direction of oscillation is reversed by the succeeding movements of the pawl.

41. The combination, in stop mechanism for organs, of a stop valve, a roller mounted for oscillation and operatively connected with the valve, means for yieldingly holding the roller at each end of its oscillating movement, and means for reversely oscillating the roller, including a pawl carrier mounted for movement relative to the roller, a reversing pawl supported for swinging movement on the carrier, and a V-shaped guide plate appurtenant to the roller, with its apex projecting toward the pawl a substantial distance from the axis of oscillation of the roller, whereby the successive swinging movement of the roller carries the apex of the guide plate alternately to opposite sides of the plane of movement of the reversing pawl, thereby guiding the said pawl alternately to different points of engagement with the roller, at the successive movements of the pawl.

42. Combined pneumatic and electric stop mechanism for organs, including a lever provided with a pallet for opening and closing a pneumatic duct, and provided also with means for opening and closing an electric circuit, and a plurality of devices for actuating the lever disposed in operative relation to the lever.

43. Combined pneumatic and electric stop mechanism for organs, including a lever provided with a pallet for opening and closing a pneumatic duct, and provided also with means for opening and closing an electric circuit, and a plurality of independent actuating devices disposed in operative relation to the lever.

44. Combined pneumatic and electric stop mechanism for organs, including in combination a lever provided with a pallet for a pneumatic windway, and provided also with means for opening and closing an electric circuit by the movements of the lever, and a plurality of independent actuating devices disposed in engaging relation to the different portions of the lever.

45. Combined pneumatic and electric stop mechanism for organs, including in combination a plurality of levers, each provided with a pallet for a pneumatic duct and provided also with means for opening and closing an electric circuit by its movements, and means for operating the said levers selectively in a plurality of different combinations, including independent sets of actuating devices operating upon different portions of the lever.

46. Stop operating mechanism for organs, including in combination a lever for controlling the action of a stop, combination devices for moving the said lever either independently or as one member of a combination, crescendo mechanism for operating the said lever as one member of a crescendo action, and sforzando mechanism for moving the said lever as one member of a sforzando action.

47. Stop operating mechanism for organs, including a plurality of stop-controlling levers, combination devices for moving the said levers either independently or in combination, devices for operating the levers in succession for crescendo effects, and devices for moving the levers simultaneously for sforzando effects.

48. Stop operating mechanism for organs, including in combination a plurality of stop-controlling levers, manual connections for moving the levers independently, combination devices for moving the levers in prearranged combinations, devices for moving the levers successively for crescendo effects, and devices for moving the levers simultaneously for sforzando effects.

In testimony whereof I have signed my name to this specification in the presence of two subscribing witnesses.

JOHN T. AUSTIN.

Witnesses:
CAROLINE M. BRECKLE,
WM. H. HONISS.